United States Patent
Dimmock

[15] 3,670,869
[45] June 20, 1972

[54] PICKING UP FLAT ARTICLES

[72] Inventor: Eric P. Dimmock, Parramatta, New South Wales, Australia

[73] Assignee: Monier Research & Development Pty. Ltd., New South Wales, Australia

[22] Filed: July 29, 1970

[21] Appl. No.: 59,300

[52] U.S. Cl. ........................................................198/185
[51] Int. Cl. ....................................................B65g 15/30
[58] Field of Search ..................198/25, 167, 185; 53/381 A

[56] References Cited

UNITED STATES PATENTS 3,313,540  4/1967  Untiedt ..............................198/25 X
2,650,748  9/1953  Bennett et al. ......................53/381 A Primary Examiner—Evon C. Blunk
Assistant Examiner—Hadd S. Lane
Attorney—Stevens, Davis, Miller & Mosher

[57] ABSTRACT

To facilitate the manual removal of flat articles from a conveyor two pneumatic rubber tired wheels are provided, one each side of the conveyor which are freely rotatably about parallel axes which are inclined relative to the conveyor. Flat articles travelling between the wheels are engaged thereby and tilted to lift the leading edge of the flat article from the conveyor.

3 Claims, 1 Drawing Figure

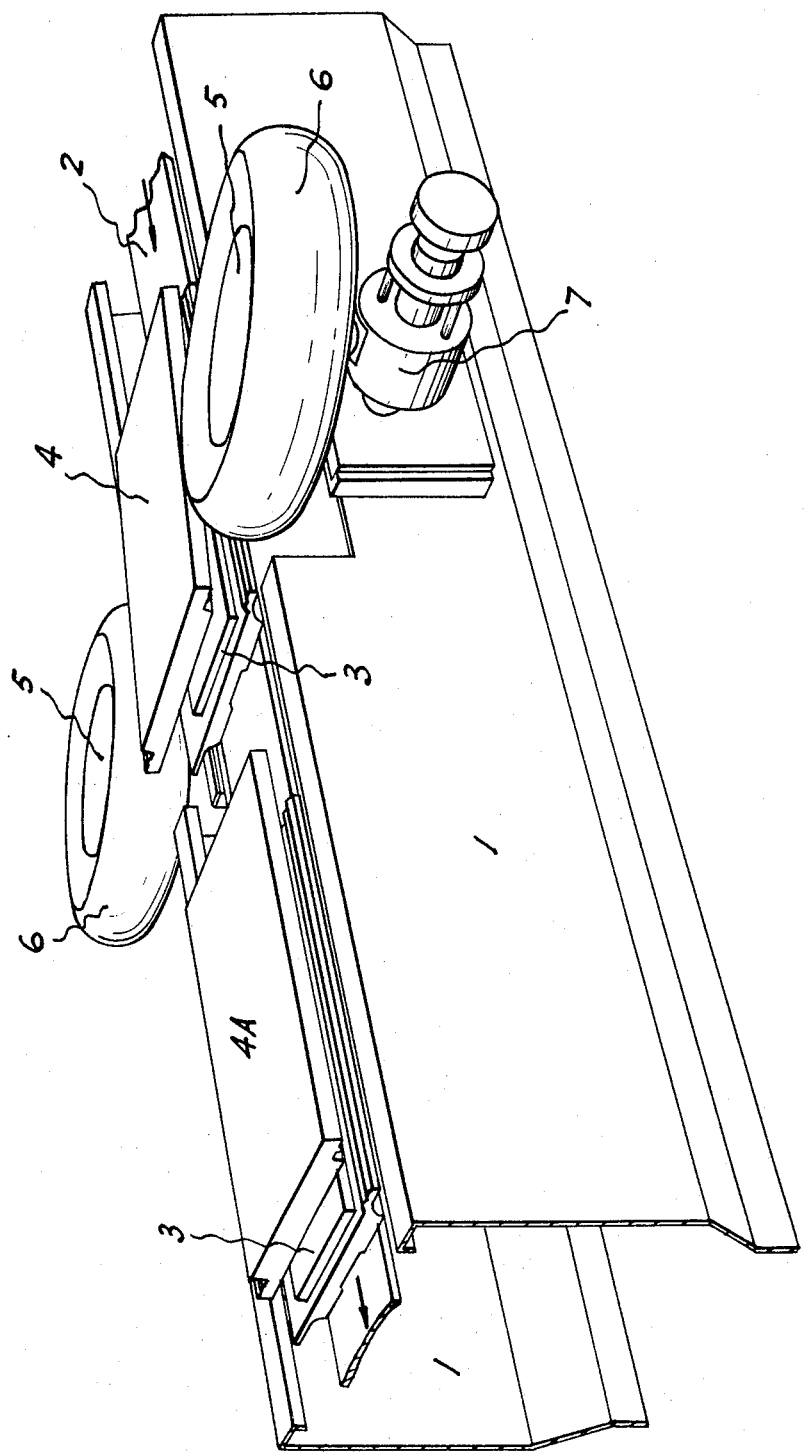

PICKING UP FLAT ARTICLES

This invention relates to the manual removal of flat articles from a conveyor on which the flat articles are travelling.

The difficulty in lifting flat articles resides in the initial lift needed to enable the finger tips to be inserted under an edge of the article, and an object of the invention is to provide simple means for slightly raising the leading edge of a flat article while it is travelling on a conveyor to enable the fingers to be inserted between the article and the conveyor element on which the article is carried.

The invention consists in the provision in a conveyor of article lifting means comprising a pair of lifting wheels disposed one each side of the conveyor and each mounted for rotation about axes which are inclined relative to the conveyor.

By way of example an embodiment of the invention is described hereinafter with reference to the accompanying drawing, which is a perspective view of portion of a belt conveyor furnished with lifting means according to the invention.

The illustrated conveyor is a part of a plant for the manufacture of concrete roofing tiles of the kind wherein the finished tiles emerge from the plant resting on the bottom halves of tile mould or pallets which are themselves carried on a belt conveyor. Thus the invention is applied in this instance to the manual removal of the tiles from the pallets.

The plant output conveyor comprises side beams 1 spanned by rollers (not shown) for the support of a conveyor belt 2 upon which a series of pallets 3 carry a corresponding series of finished concrete tiles 4.

In accordance with the invention a pair of lifting wheels 5 are provided. Each wheel 5 is preferably tired with a conventional, tough rubber, pneumatic tire 6 of the kind customarily used for the wheels of wheel barrows or similar manually propelled industrial trolleys.

The wheels 5 are free to revolve upon axles extending upwardly from outrigger brackets 7.

The tires 6 are inflated at low pressure and the wheels are spaced such that the tires 6 lightly grip the side edges of the tiles 4 travelling between them. The wheel axes are inclined relative to the conveyor belt 2 so that the inner half of the wheels for the time being inclines upwardly in the direction of travel. Thus the leading edge of each tile 4 is lifted as the tile rides between the wheels, so enabling the tile to be readily grasped for removal from its pallet.

If for any reason a tile is not removed, no harm is done because the momentum of the tile is usually sufficient to cause it to be carried through and redeposited on the pallet although at a position displaced somewhat rearwardly from its initial position. Such a tile is shown at 4A. Even if a tile fails to clear the wheels it is of little consequence as the next coming tile will push the obstructing tile clear.

As the required disposition, and position of the wheels 5 depends on the articles to be lifted the outrigger brackets 7 preferably provide for the independent adjustment of wheel altitude, angle of inclination and spacing from the center line of the conveyor.

What is claimed is:

1. A conveyor for tiles, having a longitudinally moving conveyor belt supporting a plurality of pallets in single file with tiles resting on said pallets without any substantial overhang of the tiles from the pallets, a tile lifting mechanism comprising a pair of idler axles disposed one on each side of the conveyor, said axles each being upright and adjustably inclined in relation to the conveyor, a wheel having a resilient rim mounted for free rotation on each axle, said wheels being spaced apart to engage the edges of a tile passing therebetween so that rotation of the wheels is effected solely by frictional engagement of the rims with the moving tile to lift an individual tile above its supporting pallet, an open area downstream of said tile lifting mechanism to permit a lifted tile to be re-deposited on its pallet after passing said wheels with its rear end overhanging the downstream end of the pallet.

2. A conveyor according to claim 1 wherein each axle is mounted on bracket means providing for independent adjustment of the wheel altitude, angle of inclination and distance from the conveyor center-line.

3. In a conveyor article lifting means according to claim 2 wherein each wheel is tired with a pneumatic tire.

* * * * *